Figure 8:
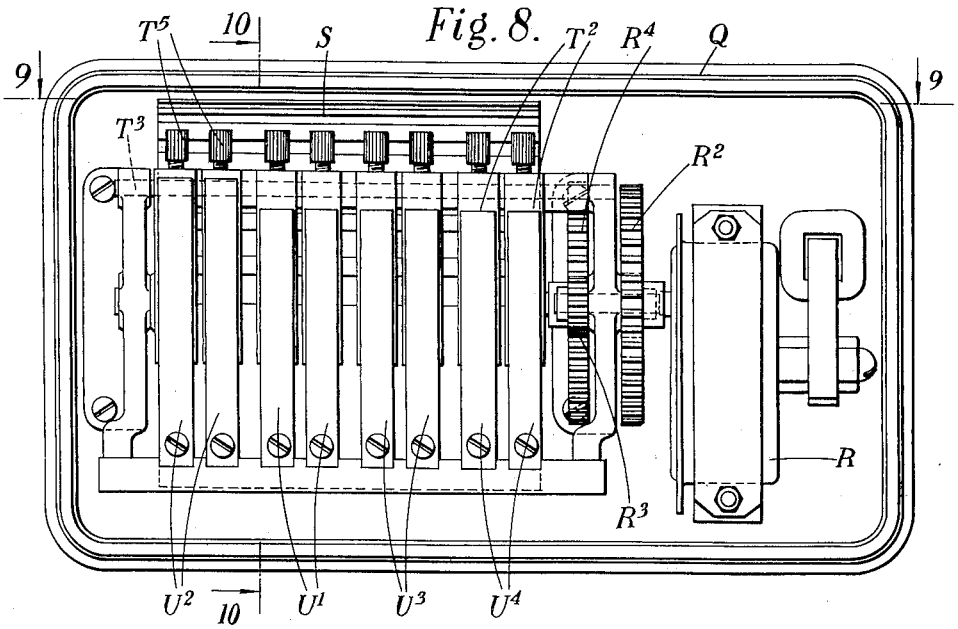

Nov. 14, 1933.  B. H. LEESON ET AL  1,935,124
ELECTRIC REMOTE CONTROL SYSTEM
Filed May 5, 1930  6 Sheets-Sheet 1
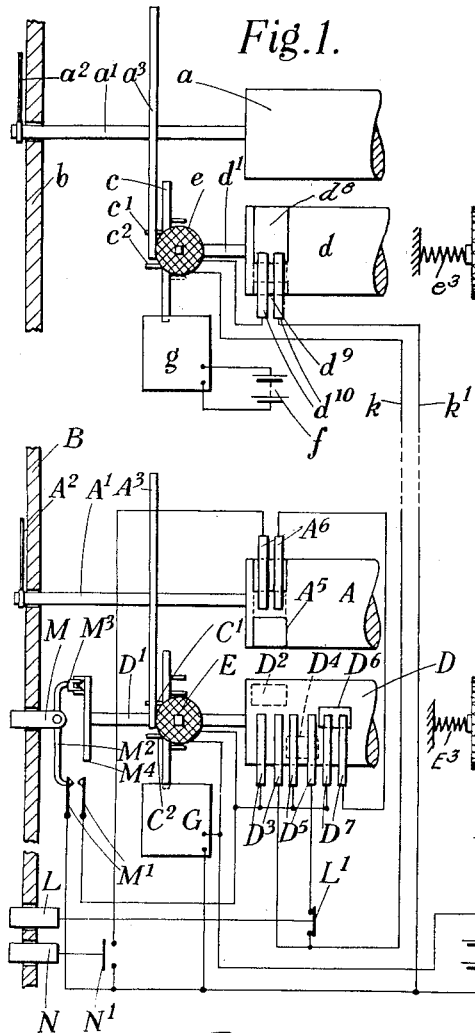
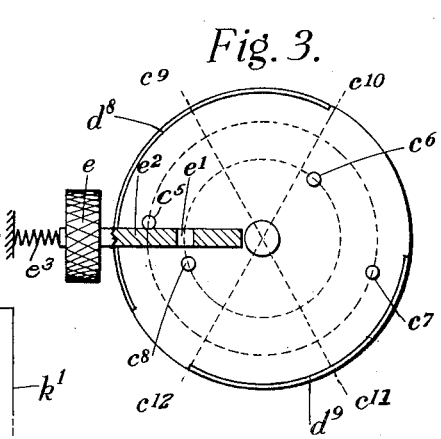
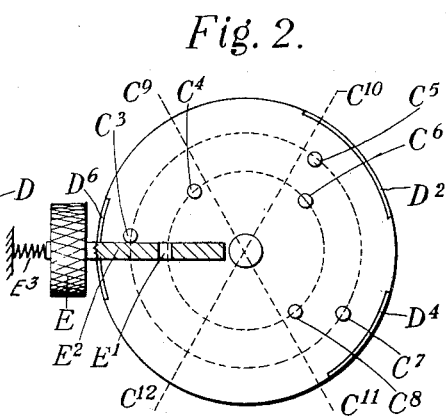
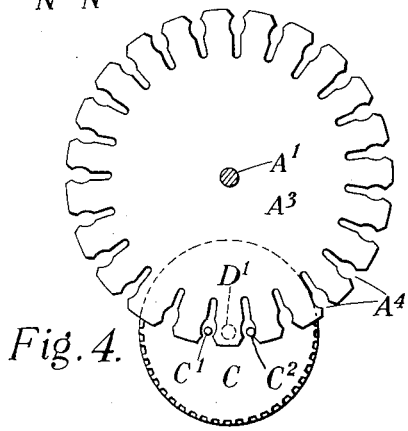
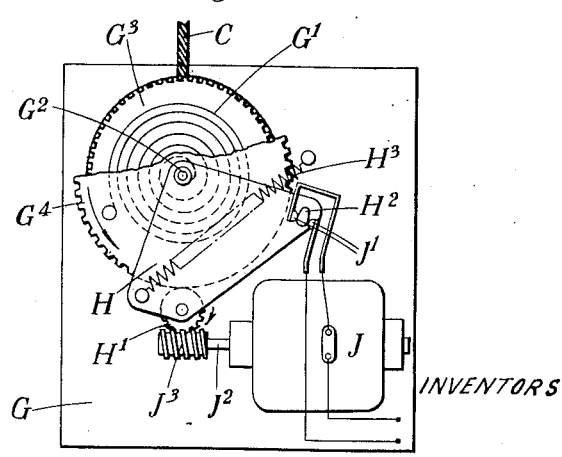

Fig. 6.

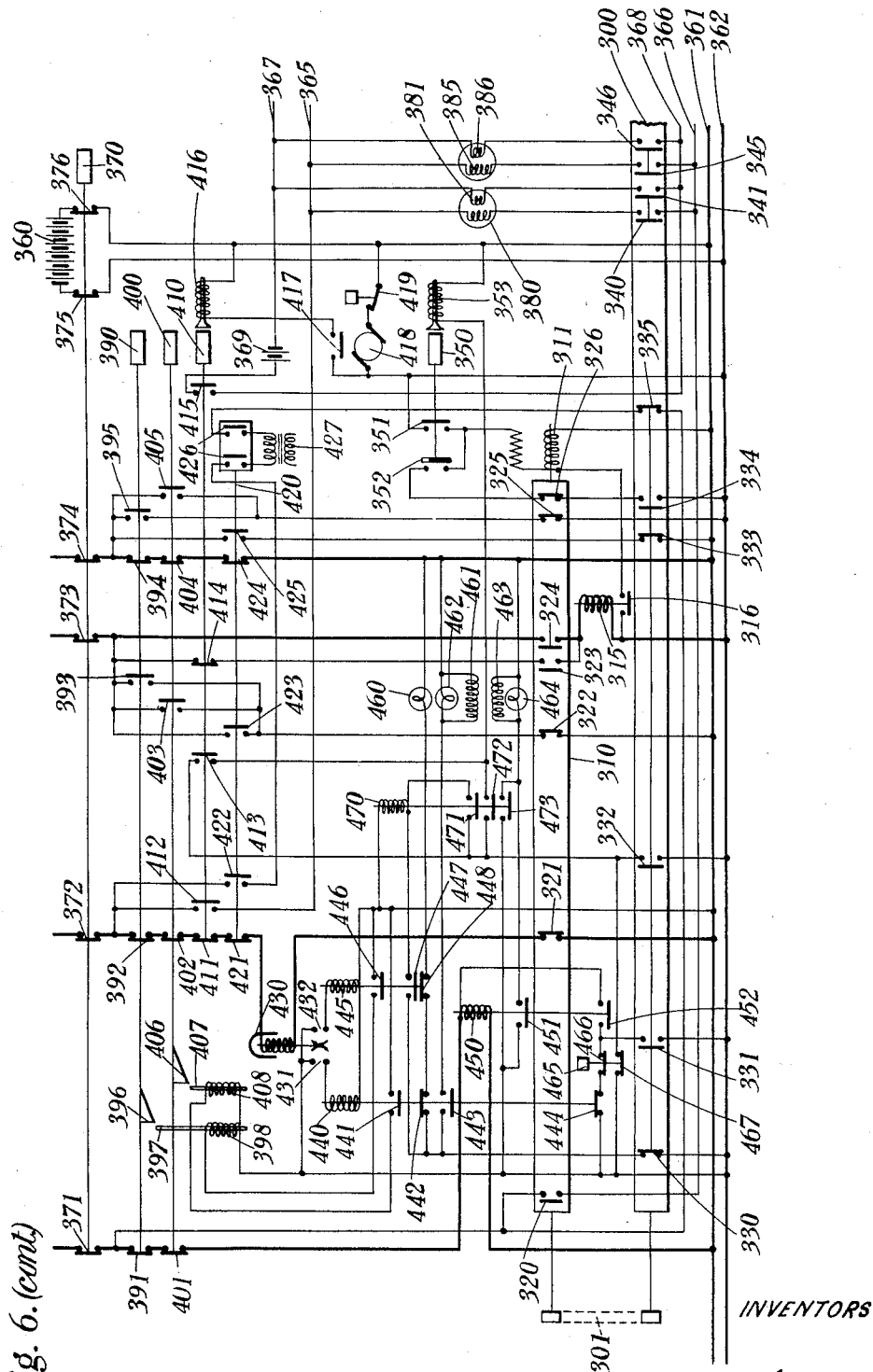

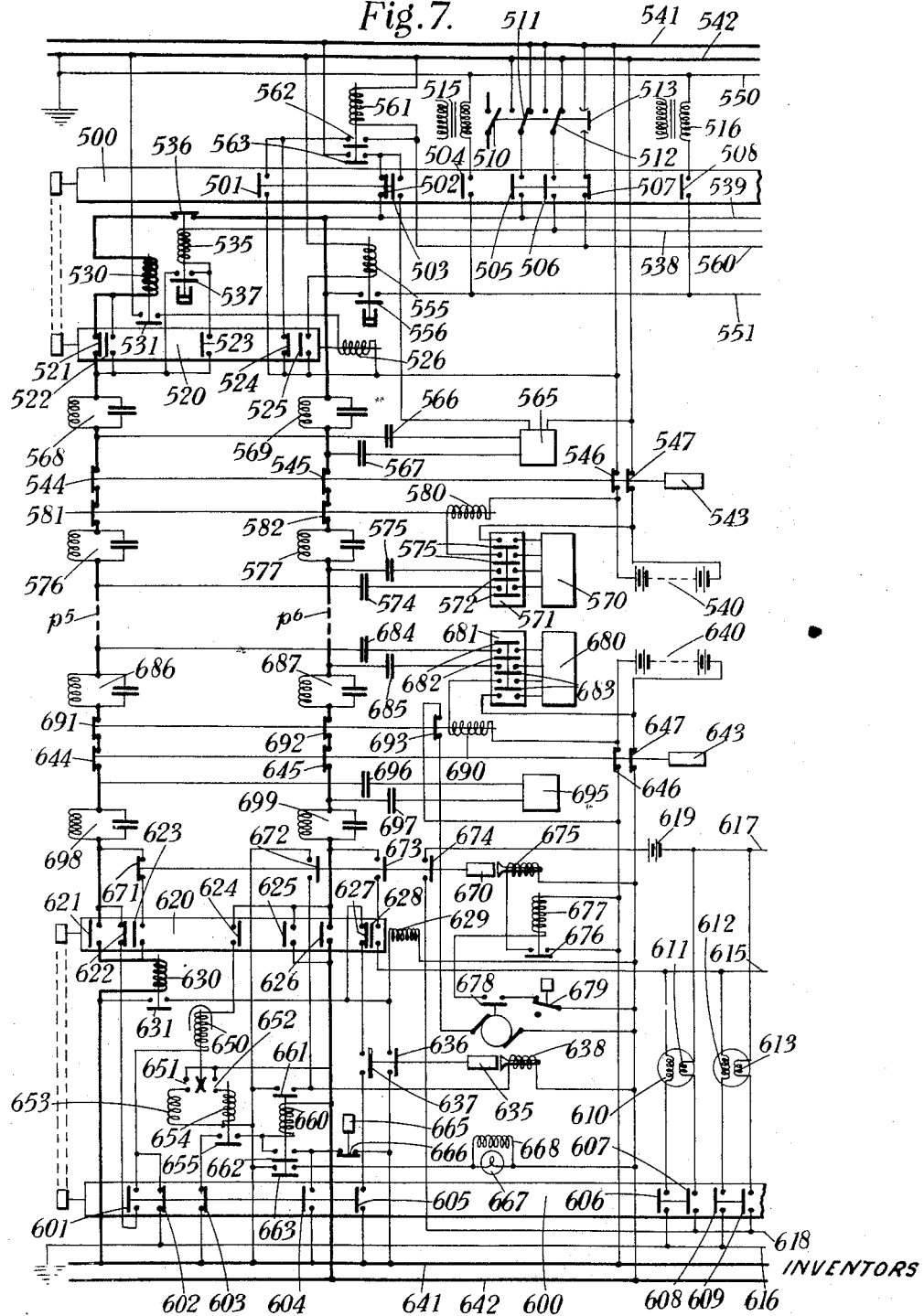

Nov. 14, 1933.   B. H. LEESON ET AL   1,935,124
ELECTRIC REMOTE CONTROL SYSTEM
Filed May 5, 1930   6 Sheets-Sheet 5

INVENTORS
Bruce Hamer Leeson,
William Anderson &
Douglas Edward Lambert,
By Watson, Coit, Morse & Grindle, ATTORNEYS

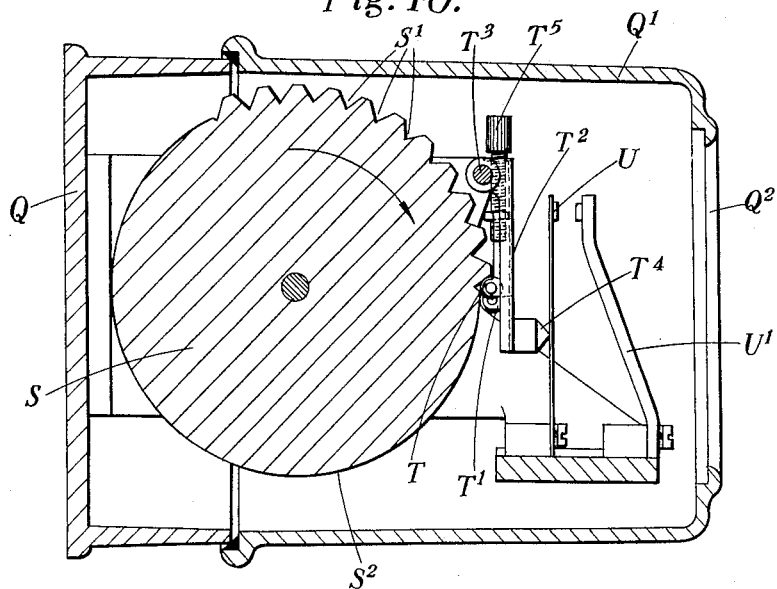
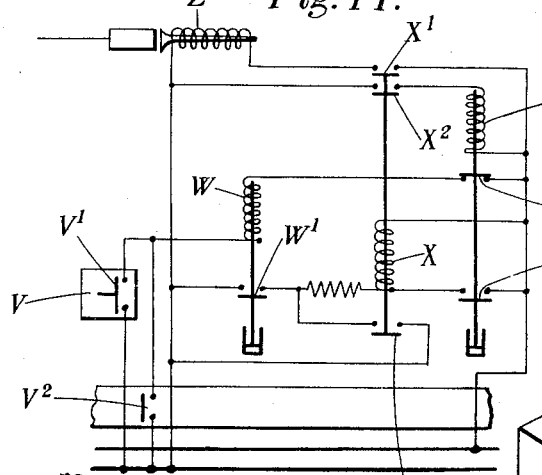
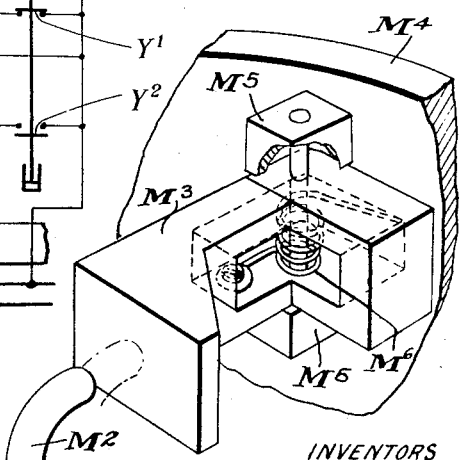

Patented Nov. 14, 1933

1,935,124

UNITED STATES PATENT OFFICE 1,935,124

ELECTRIC REMOTE CONTROL SYSTEM

Bruce Hamer Leeson, Tynemouth, William Anderson, Hebburn-on-Tyne, and Douglas Edward Lambert, Harpenden, England, assignors to A. Reyrolle & Company Limited, Hebburn-on-Tyne, England, a company of Great Britain Application May 5, 1930, Serial No. 449,968, and in Great Britain June 1, 1929

6 Claims. (Cl. 172—293)

This invention relates to electric remote control systems such for example as an electric selective remote control system for apparatus at an electric power substation, wherein an operator at the control station can select any one of a group of circuit-breakers or other apparatus at the substation and obtain a supervisory indication of its condition or can select any one of a group of metering sources at the substation and obtain a meter reading thereof at the control station, or can transmit currents for the performance of other operations in the substation.

One of the main objects of the invention is to provide an improved selector arrangement and electromechanical control therefor for use in such systems.

The majority of known systems employ relatively complicated and delicate selecting devices both at the control station and at the substation, but the present invention contemplates more especially the use of a simple and robust form of mechanical selector at the substation, which effects selection by simple step-by-step movements each from one selected position to the next, with or without a similar mechanical selector at the control station.

A further object of the invention, when such selectors are provided at both stations, is to provide simple and efficient means for ensuring accurate correspondence between the movements of the two selectors.

Another object is to provide a robust and reliable driving arrangement for the selector or for each selector, which will at the same time allow considerable latitude in the manner in which the various circuits are controlled, so that different forms of circuit control may be employed for the various purposes as may best suit the requirements of the system.

Thus in one practical embodiment of the invention each of the two selectors is driven by a rotary controlling drum, which performs a series of sequential angular movements for each stepped movement of the selector, each drum being driven by a spring under the control of an electro-magnetically operated escapement mechanism.

More detailed objects of the invention concerned especially with this practical embodiment are to provide a satisfactory control arrangement for the operating coils of the escapement mechanisms, to provide means for ensuring energization of the driving springs, and to provide a convenient practical form of escapement mechanism especially suited to the purpose.

Another object is to obtain greater variety of circuit-control by utilizing "half-notch" positions of the selectors for this purpose, the selector driving arrangement being so arranged as to permit each stepped movement of the selectors to be performed in two parts and to be arrested, if desired, when both selectors have performed their first half-notch movements.

Still further objects of the invention will be apparent from the appended claims and from the following description of the accompanying drawings, which illustrate by way of example some convenient practical arrangements according to the invention. In these drawings, Figure 1 illustrates somewhat diagrammatically a preferred selector arrangement more especially intended for use in a selective remote control system for a group of circuit-breakers or other apparatus at an electric power substation, Figures 2–5 are enlarged views of parts of the mechanism shown in Figure 1, Figure 6 is a circuit diagram of a four pilot wire selective remote control system employing the selector arrangement of Figures 1–5, Figure 7 is a circuit diagram of a modified selective remote control system in which two pilot wires only are used, Figure 8 illustrates a form of apparatus (with the casing removed) utilized in connection with the metering arrangements in the systems of Figures 6 and 7, Figures 9 and 10 are sections on the lines 9—9 and 10—10 of Figure 8, Figure 11 is a circuit diagram illustrating an alternative to the apparatus of Figures 8–10, Figure 12 is a perspective view illustrating on a larger scale a part shown in Figure 1, and Figure 13 is a view similar to Figure 3 illustrating a modified arrangement.

The selector arrangement of Figures 1–5 will first of all be described, more especially with reference to Figure 1, the upper and lower halves of which show respectively the substation and the control station apparatus.

In this arrangement the control station is provided with a rotary selector A to which step-by-step movements are imparted to bring it successively into a number of selected positions respectively associated with the substation circuit-breakers or other apparatus to be controlled. The shaft $A^1$ of the selector extends through an indicating panel B and carries a pointer $A^2$, which cooperates with markings on the front surface of the panel to give an indication of the position occupied by the selector at any moment. The panel B will in practice preferably also be provided with a number of windows through which indications of the condition of the substation apparatus are visible, the windows and the indicating devices cooperating therewith, however, being omitted from Figure 1 for the sake of simplicity.

The selector shaft $A^1$ carries a disc $A^3$ (shown on a larger scale in Figure 4) having equally spaced peripheral slots $A^4$, the number of which is equal to twice the number of selected positions. This slotted disc $A^3$ is alternately driven by two pins $C^1$ and $C^2$ mounted in diametrically opposite positions on a pin wheel C carried by the shaft $D^1$ of a rotary controlling drum D, which is caused in a manner now to be described to make a series of angular movements during each complete revolution.

On the side remote from the two driving pins $C^1$ $C^2$ the pin wheel C carries a number of other pins $C^3$, $C^4$ ... $C^8$ arranged in two circular rows at different radii. The spacing of the pins in the two rows is irregular and will be described in detail later. These pins cooperate with a slot $E^1$ in a plunger bar $E^2$, which is moved radially outwards with respect to the pin wheel C by means of an escapement coil E against the action of a spring $E^3$. Thus when the coil E is energized the slot $E^1$ lies in a radial position corresponding to that of the outer row of pins $C^3$ $C^5$ $C^7$ and allows one of these pins to pass through it, whilst when the coil E is deenergized the slot $E^1$ lies in the path of the pins $C^4$ $C^6$ $C^8$ in the inner row, the pins being staggered in the two rows so that continued rotation of the pin wheel is only possible with the alternate energization and deenergization of the coil E.

The rotary drum D is driven under the control of the pin and slot escapement mechanism by a spiral spring which is maintained energized in the following manner by an electric motor supplied from a local battery F, the spring and motor mechanism being indicated at G in Figure 1 and shown in detail in Figure 5. This mechanism comprises a spiral spring $G^1$, the inner end of which is fixed either directly to the drum shaft $D^1$ or as shown to a spindle $G^2$ carrying a worm $G^3$ engaging with worm teeth on the periphery of the pin wheel C. The outer end of the spring $G^1$ is attached to a cage $G^4$ having teeth on its periphery which engage with a planet worm wheel $H^1$ carried by a bracket H rotatable about the spring spindle $G^2$. This bracket carries a movable contact $H^2$ and is normally acted on by a fixed auxiliary spring $H^3$ in a direction to bring the contact $H^2$ into a position in which it bridges the gap between a pair of fixed contacts $J^1$ in the energizing circuit of the motor J. The shaft $J^2$ of the motor carries a worm $J^3$ engaging with the planet worm wheel $H^1$.

Thus when the auxiliary spring $H^3$ holds the contacts $H^2$ $J^1$ closed, the motor J drives the cage $G^4$ through the worm and worm wheel $J^3$ $H^1$ in the direction of the arrows to wind up the spiral spring $G^1$. The increasing tension of the spring $G^1$ finally reaches a value, such that its reactive force on the worm wheel $H^1$ together with the driving force of the worm $J^3$ overcomes the force of the spring $H^3$. This causes the planet worm wheel $H^1$ to move round the cage $G^4$ through a small angle sufficient to open the contacts $H^2$ $J^1$ and thus stop the motor J, the worm wheel $H^1$ being held in this position by the opposing forces of the two springs $G^1$ $H^3$ and the irreversibility of the worm $J^3$ with which it remains in engagement. When the spiral spring $G^1$ begins to run down as the result of driving the rotary drum D, the force exerted by the spring $H^3$ overcomes the opposing forces and moves the bracket H and planet wheel $H^1$ back again to close the contacts $J^3$ $H^1$ and start the motor J up to rewind the spring $G^1$. The spring $G^1$ is thus automatically rewound and exerts a permanent driving force on the pin wheel C.

The control station apparatus is connected to the substation through two pilot wires K $K^1$ and the various circuits from the battery F to the pilot wires and to the escapement coil E are controlled partly by contacts on the selector A and the rotary drum D and partly by hand-controlled switches. For this purpose the selector A is provided with a contact segment $A^5$ coacting with a pair of fixed spring contacts $A^6$, the arrangement being such that the contacts $A^5$ $A^6$ are closed in all selected positions other than the normal zero position of the selector, whilst the rotary drum D has three segmental contacts $D^2$ $D^4$ $D^6$ coacting respectively with pairs of fixed spring contacts $D^3$ $D^5$ $D^7$, the operation of which will be described later. It will be appreciated that the selector A and the rotary drum D will in practice also be provided with other contacts (not shown) for various purposes. One pilot wire $K^1$ is directly connected to the negative pole of the battery F, whilst the other pilot wire K is connected through two alternative circuits to one side of the escapement coil E, the other side of this coil being connected to the positive pole of the battery F. (These circuits may alternatively be taken, instead of directly to the escapement coil, to a relay controlling such coil as will be described in detail later with reference to Figures 6 and 7.) One of the two alternative circuits includes the drum contacts $D^2$ $D^3$, whilst the other includes the drum contacts $D^4$ $D^5$ and also a normally closed contact $L^1$ on one of the hand-switches L, which (as will be explained later) may be used also to control the establishment of a metering circuit. The escapement coil E is also directly connected across the battery F through the normally open contacts $M^1$ of a selecting hand-switch M of the push-button type whose function is to initiate a selecting movement. This selector push M operates its contacts $M^1$ through a lever $M^2$, one end of which normally rests against an abutment $M^3$ carried eccentrically by a disc $M^4$ on the shaft $D^1$ of the rotary drum. Thus shortly after the drum D starts to rotate, the abutment $M^3$ moves away from the lever $M^2$ and allows the selector push contacts $M^1$ to open again under spring action. The arrangement of the abutment $M^3$ is shown in detail in Figure 12, from which it will be seen that the abutment consists of a flap $M^3$ pivoted to blocks $M^5$ carried by the disc $M^4$ and normally held by a spring $M^6$ in the raised position shown, so that the end of the lever $M^2$ presses against the flat end of the flap when the selector push M is depressed. If the push M is held depressed throughout a complete revolution of the drum D, the flap $M^3$ will strike the end of the lever $M^2$ and will be rocked about its pivot thereby against the action of the spring $M^6$, but will not cause the contacts $M^1$ to be reclosed. Release of the push M will allow the flap $M^3$ to rise again into its operative position under the action of the spring, so that it can act as an abutment for the end of the lever $M^2$ when the push M is again depressed.

The apparatus at the substation is to a large extent a duplication of part of the control station apparatus and small reference letters are used in the drawings for those parts of the substation apparatus which are identical with or correspond closely to the parts of the control station apparatus designated by the corresponding capital letters. The substation apparatus will be described only in so far as it differs from the corresponding parts of the control station apparatus.

Thus the substation selector $a$ with its shaft $a^1$, pointer $a^2$ and slotted disc $a^3$ are identical with the corresponding control station apparatus, with the exception that the contacts $A^5$ $A^6$ are omitted at the substation. The disc $a^3$ is driven by pins $c^1$ $c^2$ on a pin wheel $c$ similar to that at the control station but the arrangement of the pins $c^5$ $c^6$ $c^7$ $c^8$ on the other side of the wheel differs from that of the corresponding control station pins as will be described in detail later. The escapement wheel $e$ with its plunger $e^2$, spring $e^3$ and slot $e^1$, the rotary drum $d$ with its shaft $d^1$, the spring mechanism $g$ and the battery $f$ are also similar to the correspondingly lettered control station parts (except for the substitution for the drum contacts $D^2$ $D^3$ $D^4$ $D^5$ $D^6$ $D^7$ of two segmental contacts $d^8$ $d^9$ both coacting with the same pair of fixed spring contacts $d^{10}$), but the hand-switches are omitted and the circuit arrangements are somewhat different. Thus the battery $f$ supplies current to the motor for rewinding the spring, but not to the escapement coil $e$. This coil $e$ is connected in series with the drum contacts $d^3$ $d^{10}$ or $d^9$ $d^{10}$ across the two pilot wires K K$^1$.

The arrangement of the escapement pins $C^3$—$C^8$ and $c^5$—$c^8$ on the pin wheels C and $c$ and of the drum contacts $D^2$—$D^7$ and $d^8$—$d^{10}$ will be described in the course of the following description of the sequence of operations which takes place during the performance of a selecting movement from one selected position to the next. In the normal rest condition in any selected position, both escapement coils E $e$ are deenergized, so that their plunger bar slots $E^1$ $e^1$ lie on the inner radii of the pin wheels C $c$, a pin $C^3$ or $c^5$ on the outer radius of each wheel resting against the side of the plunger bar $E^2$ or $e^2$ to hold the drum D or $d$ in its zero position. At this stage the contacts $d^8$ $d^{10}$ on the substation drum connect the substation escapement coil $e$ to the pilot wires K K$^1$, but both the alternative circuits above mentioned at the pilot wires at the control station are broken at the contacts $D^2$ $D^3$ and $D^4$ $D^5$. The angular spacings of the drum segmental contacts $D^2$ $D^4$ $D^6$ and $d^8$ $d^9$ are diagrammatically indicated in Figures 2 and 3 respectively for the sake of clearness.

If now it is desired to initiate a selecting movement, the selector push M is depressed. The lever $M^2$ rocks about the abutment $M^3$ and closes the contacts $M^1$, thus energizing the control station escapement coil E. The plunger bar $E^2$ consequently moves outwards and allows the pin $C^3$ to pass through the slot $E^1$. The drum D now rotates through a small angle under the action of the spring $G^1$, its movement being arrested by the pin $C^4$ on the inner radius. Meanwhile the selector push contacts $M^1$ have been opened mechanically by the movement of the abutment $M^3$ away from the end of the lever $M^2$, and the consequent deenergization of the coil E allows the plunger bar $E^2$ to move inwards again under the action of the spring $E^3$ so that the pin $C^4$ can pass through the slot $E^1$. At this stage one of the driving pins $C^1$ has moved into engagement (at the position indicated by the dotted line $C^9$ in Figure 2) in a slot $A^4$ in the disc $A^3$, and the subsequent spring-driven rotation of the drum D therefore drives the selector A through its first half-notch movement. This movement is arrested, when the half-notch position is reached at the position indicated by the dotted line $C^{10}$, by the pin $C^5$. At the same time however the drum contacts $D^2$ $D^3$ close, so that a circuit is complete from the control station battery F through the two escapement coils E $e$ and the pilot wires K K$^1$, this circuit including the drum contacts $D^2$ $D^3$ and $d^8$ $d^{10}$. The consequent energization of the coils E $e$ moves both plunger bars $E^2$ $e^2$ outwards so that the pins $C^5$ $c^5$ pass through the slots and both drums D $d$ rotate. The rotation of the control station drum is however arrested almost at once by the pin $C^6$, the contacts $D^2$ $D^3$ still remaining closed. The substation drum $d$ continues to rotate, first of all bringing one of its driving pins $c^1$ into engagement in a slot in the selector disc $a^3$ at the position $c^9$, and then driving the substation selector $a$ through its first half-notch movement. When this movement is completed at the position $c^{10}$, the rotation of the drum $d$ is arrested by the pin $c^6$ and at the same time the drum contacts $d^8$ $d^{10}$ open to break the energizing circuit to the two escapement coils E $e$. The consequent inward movements of the two plunger bars $E^2$ $e^2$ allow the pins $C^6$ $c^6$ to pass through their slots and the drums D $d$ to rotate further until arrested by the pins $C^7$ $c^7$, this further movement not affecting the selectors since the driving pins $C^1$ $c^1$ have meanwhile come out of driving engagement at the positions indicated by the dotted lines $C^{10}$ $c^{10}$.

At this stage the first half-notch movements have been completed, the two drums D $d$ both having closed their contacts $D^4$ $D^5$ and $d^9$ $d^{10}$ in the escapement coil circuit. This circuit is however also controlled by the meter switch contact $L^1$ and if the meter switch L has meanwhile been operated, the drums and selectors remain at rest in their half-notch positions.

If on the other hand the meter switch is in its normal position, the two escapement coils E $e$ are again energized and their plunger bars $E^2$ $e^2$ move outwards to allow the pins $C^7$ $c^7$ to pass through the slots. The rotation of the control station drum D is however arrested almost at once by the pin $C^8$ (the contacts $D^4$ $D^5$ still remaining closed), but the substation drum $d$ continues its rotation until arrested by the pin $c^8$ just before it completes a revolution. During this movement the second driving pin $c^2$ has come into engagement at the point $c^{11}$ with the next slot in the disc $a^3$ and has driven the selector $a$ through its second half-notch movement, at the completion of which at the point $c^{12}$ the pin $c^2$ comes out of engagement simultaneously with the opening of the drum contacts $d^9$ $d^{10}$. The consequent deenergization of the two escapement coils E $e$ permits the plunger bars $E^2$ $e^2$ to move inwards to allow the passage of the pins $C^8$ $c^8$, so that the drums D $d$ can complete their rotation until arrested by the pins $C^3$ $c^5$ in the normal zero position, the control station selector A having meanwhile been driven between the points $C^{11}$ $C^{12}$ through its second half-notch movement by the second driving pin $C^2$. This completes the selecting movement and the selectors A $a$ are now again at rest in the newly selected position, wherein they remain until the selector push M is again depressed to initiate a further selecting movement.

It will be appreciated that with the arrangement above described each selecting movement from one position to the next must be initiated by a separate depression of the selector push M. It will often be desirable, however, especially when there are a large number of selector positions, to provide means whereby the operator can proceed through a number of selector positions without such repeated operation of the selector push. Such "express selection" can be obtained in a variety of ways. In one simple arrangement (illustrated in Figure 1) a separate "express selection" hand-push N is provided, whose contacts $N^1$ are connected in series with the control station selector contacts $A^5$ $A^6$ (closed in all selected positions except the normal zero position of the selector) and with the control station drum contacts $D^6$ $D^7$ (closed only in the normal rest position of the drum), this circuit bridging the selector push contacts $M^1$. Thus in the normal zero position of the selectors A a, depression of the express selection push N will be ineffective, but in all other positions it will cause a series of selecting movements (each similar to the one selecting movement initiated by depression of the selector push M) to be performed until either the push N is released (when the apparatus will come to rest at the completion of the selecting movement in progress at the moment of release) or the normal zero position is again reached. For the initiating energization of the control station escapement coil E will be brought about as each selected position is reached by the express push contact circuit above mentioned, this circuit being broken at contacts $D^6$ $D^7$ almost immediately after the drum D starts to rotate and being completed again every time the drum completes a revolution until the zero position is again reached, provided that the push N is held depressed.

Another simple arrangement enables both step by-step selection and express selection to be obtained by a single hand-push, to which a depression and release movement can be imparted for step-by-step selection, whilst express selection can be obtained by depressing and twisting the push which remains held in the twisted position, release being effected by the reverse movements. It will be understood that with this modification the twisting movement will effect closing of a contact similar to the express push contact $N^1$ of Figure 1. This modification has the advantage of enabling express selection to be started in the normal zero position so that a complete cycle can be performed. It may often be convenient with this modification to superimpose an electromagnetic control of the push on the hand control, so that an express selecting cycle can be performed automatically when required. This modification is utilized in the remote control systems to be described later with reference to Figures 6 and 7.

It should be mentioned that in certain modifications (as for example in the system of Figure 7) it is desirable to arrange that the two selectors perform their second half-notch movements simultaneously instead of in sequence. This can be achieved by a simple modification of the arrangement of the pins on the pin wheel c as shown in Figure 13, which differs from Figure 3 solely in the fact that the pin $c^8$ is omitted and replaced by a pin $c^{13}$ disposed in a position analogous to that of the pin $C^8$ on the pin wheel C.

It will be appreciated that the above-described arrangement ensures correct correspondence of movement between the two selectors A a, and moreover enables not only the full-notch selected positions but also the half-notch positions to be utilized for establishing remote control circuits, since the second half-notch movement will be arrested if the meter switch contact $L^1$ is open at the appropriate stage in the sequence of operations. This provides a convenient arrangement for the selective establishment of metering circuits, although as will readily be understood the half-notch positions could alternatively be employed for purposes other than metering. The actual manner in which the selector arrangement is utilized in a remote control system will vary in accordance with the requirements of the system, but Figures 6 and 7 illustrate diagrammatically two convenient arrangements and will now be described in detail taking the arrangement of Figure 6 first.

In the arrangement of Figure 6 the control station and substation are connected together by means of four pilot wires $P^1$ $P^2$ $P^3$ $P^4$. The substation equipment includes a rotary selector 100, which is driven by mechanism diagrammatically indicated at 101 from a rotary controlling drum 110 controlled by an escapement coil 111 in the manner described with reference to Figures 1—5. The rotary drum 110 has contacts 120—124 operated in various angular positions as will be described later, and the selector 100 has a number of groups of contacts associated with its various positions. Thus the selector contacts 130—134 are associated with the normal zero position. The contacts 140 are operated in the half-notch position immediately following the normal zero position and further contacts 145 ... are similarly operated in the half-notch positions following other selected positions. The contacts 150—154 are operated in the second selector position, which in the example illustrated is shown as associated with one of the substation circuit-breakers 160.

This circuit-breaker 160 (shown in the drawings as typical of the substation controlled apparatus) has a closing coil 161, a trip coil 162 and four auxiliary switches 163—166 which are operated when the circuit-breaker changes from the open to the closed position or vice versa. The switch 163 is closed when the circuit-breaker 160 is open and opens when the circuit-breaker closes, whilst the switch 164 is open when the circuit-breaker is open and closes when the circuit-breaker closes. The switch 165, which may be termed a "flick" switch, is open in both positions of the circuit breaker but closes momentarily during the passage of the circuit-breaker from one position to the other. The switch 166 is formed as a change-over switch and moves from one operative position to the other as the circuit-breaker changes its condition.

These auxiliary switches and the corresponding selector contacts control the connections between various busbars in the substation and a local battery 170, the two poles and the midpoint of which are respectively connected to a positive busbar 171, a negative busbar 172 and a neutral busbar 173 through the contacts 187, 185, 186 of a lock-out switch 180 having further contacts 181, 182, 183, 184 controlling the connections of the four pilot wires $P^1$ $P^2$ $P^3$ $P^4$ to the substation equipment. The circuit-breaker closing coil 161 is connected in series with the selector contacts 150 between the negative busbar 172 and a closing busbar 190. The trip coil 162 is similarly connected in series with the selector contacts 151 between the negative busbar 172 and a tripping busbar 191. The selector contacts 150

152 are connected on one side to the negative busbar 172 and on the other side either through the auxiliary switch 163 to a close relay busbar 192 or through the auxiliary switch 164 to a trip relay busbar 193. The flick switch 165 in series with the selector contacts 153 connects the positive busbar 171 to a general alarm busbar 194. An indicating busbar 195 is connected through the selector contacts 154 to the change-over switch 166 and thence either to the positive busbar 171 or to the negative busbar 172 in accordance with whether the circuit-breaker 160 is closed or open. Two further busbars 196, 197 are provided for metering purposes, and the various substation metering sources 200, 205 . . . are respectively connected in series with the half-notch selector contacts 140, 145 . . . between these two busbars.

The escapement coil 111, instead of being directly connected to the pilot wires as in the arrangement of Figures 1—5, is energized from the substation positive and negative busbars 171, 172 under the control of a normally open contact 212 on a selector relay 210 having a further normally closed contact 211. This selector relay 210 is in turn controlled by a polarized relay 220, which is directly connected through the rotary drum contacts 124 and the lock-out contacts 183, 184 to the two pilot wires $P^3$ $P^4$. This polarized relay 220 is responsive to currents of either polarity received from the control station over these pilot wires and makes one or other of its contacts 221, 222 in accordance with the polarity of the current received. The contact 221 controls the energizing circuit from the busbars 171, 172 to the selector relay 210, whilst the other contact 222 controls a similar energizing circuit to an executive relay 230 having contacts 231—234. This executive relay acts on the reception of the appropriate control current from the control station to cause executive functions to be performed on the selected substation apparatus, such for example as the tripping or closing of a selected circuit-breaker. The performance of a tripping or closing operation is controlled by a trip relay 240 having contacts 241—243 or by a close relay 245 having contacts 246—248, the energizing circuits to these relays being controlled by the executive relay contact 233. Thus the energizing circuit to the trip relay 240 is taken from the positive busbar 171 through the executive relay contact 233, an interlock contact 248 on the close relay, the trip relay 240, the trip relay busbar 193, the circuit-breaker auxiliary switch 164, and the selector contacts 152 to the negative busbar 172, and the corresponding circuit to the close relay 245 is taken from the positive busbar 171 through the contact 233, an interlock contact 242 on the trip relay 240, the close relay 245, the close relay busbar 192, the auxiliary switch 163 and the selector contacts 152 to the negative busbar 172. Thus when the executive relay 230 is energized in a selected position, the condition of the selected circuit-breaker 160 determines which of the two relays 240, 245 shall be operative, whilst the interlock contacts 242, 248 ensure that neither relay can be energized unless the other is deenergized. The two relays make their own retaining circuits respectively at contacts 243 and 247 to render them independent of the auxiliary switches 164, 163, which will be operated as the circuit-breaker changes its condition, thus preventing the alternate energization of the two relays and the consequent opening and closing of the circuit-breaker which would otherwise take place as long as the executive relay contact 233 remains closed. The trip relay contact 241 controls a connection from the positive busbar 171 to the tripping busbar 191 and consequently also the energization of the circuit-breaker trip coil 162, whilst the close relay contact 246 controls a similar connection to the closing busbar 190 and the circuit-breaker closing coil 161.

The indicating busbar 195 is directly connected through the lock-out contact 184 to the pilot wire $P^4$, and this busbar serves as part of a circuit (to be described in detail later) for the transmission to the control station over the pilot wires $P^2$ $P^4$ of currents for giving supervisory indications of the condition of the selected substation circuit-breaker or other apparatus, the return circuit from the pilot wire $P^2$ being taken through the lock-out contact 182 and a contact 253 on a meter relay 250 having other contacts 251, 252 to the neutral busbar 173.

The meter relay 250 is energized from the positive and negative busbars 171, 172 through the rotary drum contacts 121 and has a time-lag long enough to prevent operation of its contacts during the period of closing of the contacts 121 in the normal selecting process. The meter relay contacts 251, 252 respectively control the connections of the two metering busbars 196, 197 to the first two pilot wires $P^1$ $P^2$, this metering circuit being described in detail later.

The normal zero position of the selector is reserved for special purposes such as the establishment of telephone communication between the control station and the substation and the transmission to the control station of general alarm currents to indicate to the control station operator that some change has taken place automatically in the condition of the substation controlled apparatus.

The transmission of a telephone calling current from the control station to the substation in the normal zero position is effected, as will be explained later, in a manner exactly corresponding to the transmission of executive currents, the differentiation between such currents being carried out at the substation owing to the condition of the contacts on the selector 100. Thus when the selector is in its normal zero position, its various contacts such as 152 associated with the other selected positions are open, and the energizing circuits of the trip and close relays 240, 245 are therefore broken. In this case however the executive relay contacts 232 and 234, which are respectively connected in series with the selector contacts 133, 134 closed only in the normal zero position, are operative. The contact 234 prepares the telephone speaking circuit over the pilot wires $P^1$ $P^2$, this circuit which includes the telephone instrument indicated at 260 being described in detail later, whilst the contact 232 completes the circuit from the busbars 171, 172 to the substation telephone calling bell 262, this circuit including the usual receiver hook switch 261 and being broken when the substation operator lifts his receiver to respond to the call.

For transmitting a telephone calling current from the substation to the control station a telephone push 265 having contacts 266—268 is provided. The normally closed contact 267 is in series with the telephone speaking circuit and the push 265 must be released after the call has been transmitted in order to establish the speaking circuit. The contact 268 is in the form of a change-over switch in series with the selector contacts 132 closed only in the normal zero position and when the push is depressed connects the pilot wire $P^4$ to the positive busbar 171, thus transmitting a current to the control station over the pilot wires $P^2$ $P^4$ generally similar to the indicating current transmitted in the case when a selected circuit-breaker is closed. The contact 266 controls a connection from the neutral busbar 173 through the selector contacts 130 closed in all selected positions other than the normal zero position to the pilot wire $P^1$, and is provided for the purpose of enabling a telephone calling current to be transmitted to the control station over the pilot wires $P^1$ $P^4$ when the selector is in any position other than the normal zero position.

The transmission of general alarm currents to the control station is controlled by a general alarm relay 270 having contacts 271—275. This relay 270 is connected between the negative busbar 172 and the general alarm busbar 194 and is consequently energized momentarily whenever one of the circuit-breaker flick switches 165 closes as the result of an automatic change of condition of the circuit-breaker. In the case of a controlled apparatus other than a circuit-breaker a device equivalent to a flick switch would be provided which acts to connect the general alarm busbar 194 momentarily to the positive busbar 171 when an alarm signal is to be initiated. It will be noted that the flick switch 165 is in series with the selector contacts 153 which are closed in all selector positions other than that corresponding to the particular circuit-breaker 160. The reason for this is that it is not desired to initiate a general alarm signal when the change of condition of the circuit-breaker takes place as the result of the transmission of an executive current from the control station, and if it should happen that a circuit-breaker changes its condition automatically while the selector is occupying the associated position, the supervisory indicating circuit will be complete and the change of condition would be immediately apparent from the control station indicating mechanism without the necessity for a general alarm signal.

The general alarm relay contact 271 controls the transmission of the general alarm current over the pilot wires $P^2$ $P^4$ to the control station in the normal zero position, this contact controlling a connection from the negative busbar 172 through the telephone push contact 268 in its normal position and the selector contacts 132 to the pilot wire $P^4$, the general alarm current thus being similar to a circuit-breaker-open supervisory indicating current. The contact 272 is in parallel with the telephone push contact 266 and serves for transmitting a general alarm current over the pilot wires $P^1$ $P^4$ when the selector is in any position other than the normal zero position. The contact 275 acts to break the metering or telephone speaking circuit. The contact 274 is a retaining contact for the general alarm relay to hold that relay energized after its primary energizing circuit has been opened by the flick switch. This retaining contact 274 is in series, either through the selector contacts 131 closed in all half-notch and full-notch positions except the normal zero position or through the drum contacts 120 closed when the selector is occupying its normal zero or any other full-notch position, with a contact 281 on a definite time limit relay 280. This relay 280 is energized immediately the general alarm relay operates over a circuit including the general alarm relay contact 273 and interlock contacts 211 and 231 on the selector and executive relays, and thus holds the general alarm relay energized for a definite time interval.

The control station equipment, which will now be described, includes a rotary selector 300 driven through intermittently acting gearing indicated at 301 from a rotary controlling drum 310 controlled by an escapement coil 311, the selector and drum with their actuating mechanism being arranged generally in the manner described with reference to Figures 1—5. The rotary drum 310 has contacts 320—326 operated in various angular positions of the drum, and the selector 300 is provided with a group of contacts 330—335 associated with its normal zero position and other groups of contacts such as 340—341, 345—346 associated with its various half-notch positions. The escapement coil 311 is not directly connected to the pilot wire circuit but is controlled by the contact 316 of a selector relay 315 connected in that circuit. The escapement coil circuit is however directly controlled by the contact 351 on the selector push 350 and by the express selection contact 352 (which in this case is preferably operated in the manner above referred to by depressing and twisting the selector push 350). The selector push is so arranged as to permit not only of operation by hand but also of operation electromagnetically by a coil 353 energization of which causes the push to be depressed and twisted to close both the contacts 351 and the contacts 352.

A local battery 360 is provided in the control station and its connections to the positive and negative busbars 361, 362 are controlled by contacts 376, 375 on a lock-out switch 370 which also has contacts 371, 372, 373, 374 in series respectively with the four pilot wires $P^1$ $P^2$ $P^3$ $P^4$. The control station is also provided with two metering busbars 365, 366, between which are connected in series with the selector contacts 340, 345 ... the various meters 380, 385 ... associated respectively with the substation metering sources 200, 205 ... Each meter is preferably of the self-recording kind wherein a locking coil 381 or 386 is provided which acts when deenergized to hold the meter pointer or an auxiliary pointer in its indicating position after the meter has been deenergized. The locking coils 381, 386 ... are connected in series with the selector contacts 341, 346 ... between two meter locking busbars 367, 368 energized from an auxiliary small battery 369.

The escapement coil 311 is connected on one side to the positive busbar 361, and on the other side to the negative busbar 362 through the selector push contact 351 or through the selector relay contact 316 or through the express selection contact 352 and the contacts 326 and 334 on the drum 310 and the selector 300. The selector relay 315 is connected on one side to the negative busbar 362 and on the other through the drum contacts 324 and the lock-out contact 373 to the pilot wire $P^3$.

The connections of the other pilot wires $P^1$ $P^2$ $P^4$ to the control station equipment are controlled by various contacts of a trip push 390, a close push 400, a meter switch 410 and a dummy telephone push 420. The trip push 390 has contacts 391—395, of which the normally closed contacts 391, 392 and 394 are respectively in series with the normal connections from the pilot wires $P^1$ $P^2$ $P^4$, whilst the normally open contacts 393, 395 make alternative connections from the pilot wires $P^3$ $P^4$ through the drum contacts 322, 325 to the positive and negative busbars 361, 362 respectively. The close push 400 has a corresponding set of contacts 401—405, of which the normally closed contacts 401, 402, 404 are in series with the trip push contacts 391, 392, 394 and the normally open contacts 403, 405 are in parallel with the trip push contacts 393, 395. The trip push 390 and the close push 400 are each provided with a projection 396 (or 406) which is engaged by the plunger 397 (or 407) of a coil 398 (or 408) in order to lock the push 390 (or 400) against operation when the coil 398 (or 408) is energized.

The meter switch has contacts 411—415, of which the normally closed contact 411 is in series with the normal circuit to the pilot wire $P^2$ and the normally open contact 412 makes an alternative connection from this pilot wire to the metering busbar 365. The normally closed contact 414 in series with the drum contacts 323 provides an alternative circuit from the pilot wire $P^3$ to the selector relay 315 in parallel with the circuit through the drum contacts 324. The normally closed contact 415, which is arranged to close just after the contacts 412, 413 and to open just before those contacts, acts to connect the meter locking busbars 367, 368 together through the auxiliary battery 369. The function of the normally open contact 413 will be referred to later. The meter switch 410 can be operated either by hand or electromagnetically when a coil 416 is energized.

The telephone dummy push 420, which has contacts 421—425, is mechanically operated by the insertion of a telephone plug 426, which controls the connection of the telephone instrument 427 to the pilot wires $P^1$ $P^2$, this telephone speaking circuit including in addition to the lock-out contacts 371, 372 the selector contacts 335 closed only in the normal zero position and the normally open dummy push contact 422. The plug 426 is arranged to remain in only so long as a "pressel" switch on the telephone instrument is held gripped and depressed. The normally closed dummy push contacts 421, 424 are in series with the trip push contacts 392, 394 and the normally open contact 423 is in parallel with the trip push contact 393, whilst the normally open contact 425 makes an alternative circuit from the pilot wire $P^4$ to the positive busbar 361 through the selector contacts 333 closed only in the normal zero position.

The normal connections of the pilot wires $P^1$ $P^2$ $P^4$ are all taken to the positive busbar 361, that of the pilot wire $P^4$ being direct through the contacts 374, 394, 404, 424, whilst that of the pilot wire $P^2$ includes in addition to the contacts 372, 392, 402, 411, 421 a polarized indication relay 430 and the drum contacts 321, and that of the pilot wire $P^1$ includes in addition to the contacts 371, 391, 401 a general alarm relay 450.

The polarized indication relay 430 receives the supervisory indicating currents (and also the telephone calling and general alarm currents) from the substation and operates one or the other of its contacts 431, 432 in accordance with the polarity of the current received. These two contacts respectively control the energizing circuits of a positive coil 440 and a negative coil 445 which operate suitable indicating mechanism (such for example as one or other of the indicating mechanisms described in United States Patent application Serial No. 318,973 standing in the names of one of the present applicants and another, or the indicating mechanism forming the subject of the concurrent United States Patent application Serial No. 449,991 in the names of one of the present applicants and another.)

The coils 440, 445 also serve to operate contacts 441—444 and 446—448 respectively, of which the contacts 446, 441 respectively control the energizing circuits of the locking coils 398, 408 of the trip and close pushes. Thus if the received indicating current is of such a polarity as to indicate that the selected circuit-breaker is closed, the polarized relay 430 will close its contact 431 and energize the positive coil 440, whereby the locking coil 408 is energized to lock the close push 400 against operation, whilst a circuit-breaker-open signal will likewise cause the trip push 390 to be locked against operation. The positive and negative coil contacts 442, 448 are normally closed and in series with one another in the energizing circuit of a green lamp 460, this circuit also being controlled by the selector contacts 330 closed only in the normal zero position. Thus the green lamp 460 is illuminated when the system is at rest in the normal zero position without either telephone or general alarm currents flowing. The normally open positive coil contact 443, also in series with the selector contacts 330, controls the energizing circuit to a telephone buzzer 461 and red lamp 462. The normally open negative coil contact 447 controls the energizing circuit through the selector contacts 330 to a reindication relay 470 having contacts 471—473. The normally closed positive coil contact 444 controls a retaining circuit for the general alarm relay 450.

The general alarm relay 450 has two normally open contacts 451, 452 of which the first 451 controls the energizing circuit of an alarm buzzer 463 and red lamp 464, whilst the second 452 is a retaining contact to hold the general alarm relay energized over a circuit including either the selector contacts 331 (closed in all positions except the normal zero position) or the positive coil contact 444 in series with a contact 466 on a stop alarm push 465 having a further contact 467. The circuit to the alarm buzzer 463 and red lamp 464 is also controlled by the contact 473 of the reindication relay 470. The contact 471 of this relay is a retaining contact to hold the relay energized over a circuit including the selector contacts 332 closed in all selector positions other than the normal zero position, the stop alarm push contact 467 being in parallel with these selector contacts. The remaining reindication relay contact 472 in parallel with the meter switch contact 413 controls the energizing circuit of the coil 353 acting electromagnetically on the selector push 350, this circuit also including the parallel-connected contacts 467 and 332.

The electromagnetic control of the meter switch 410 by the coil 416 is provided for the purpose of enabling the readings recorded on the control station meters 380, 385 . . . to be periodically corrected automatically, since otherwise the record of meter readings may be misleading if any considerable time is allowed to elapse after the establishment of an individual metering circuit before it is again established. The apparatus employed for initiating the desired automatic periodic meter correction will be described in detail later with reference to Figures 8–10, but at the present stage it may be mentioned that the coil 416 is repeatedly energized and deenergized at suitable intervals under the control of contacts indicated at 417 and operated by a constant speed motor 418. A hand-switch 419 is provided to cut the motor 418 out of action when required.

The operation of the system of Figure 6 will now be described. The apparatus is shown at rest with the selectors in the normal zero position. If now it is desired to initiate a selecting movement, the control station operator will depress his selector push 350 (after opening the switch 419 to cut out the periodic meter correcting apparatus). This completes a circuit at contact 351 for the escapement coil 311, and the rotary drum 310 executes its preliminary movements, as already described with reference to Figures 1-5, to effect the mechanical opening of the selector push contact 351, to drive the selector 300 through its first half-notch movement and then to close the contacts 324, (the contacts 321, 322, 325, 326 being opened at an early point in the rotation of the drum). It should be mentioned that the contacts 324 correspond to the contacts $D^2 D^3$ of Figure 1, the contacts 323 to the contacts $D^4 D^5$, the contacts 326 to the contacts $D^6 D^7$, the contacts 124 to the contacts $d^8 d^{10}$, and the contacts 123 to the contacts $d^9 d^{10}$. A circuit is now complete from the control station negative busbar 362 through the selector relay 315, the contacts 324, 373, the pilot wire $P^3$, the contact 183, the substation polarized relay 220, the contacts 124, 184, the pilot wire $P^4$ and the contacts 374, 394, 404, 424 to the positive busbar 361. The control station selector relay 315 and the substation polarized relay 220 are energized over this circuit, the former relay reenergizing at its contact 316 the control station escapement coil 311, whilst the polarized relay 220 operates in a direction to close its contacts 221 and energize the substation selector relay 210. This relay 210 energizes at contact 212 the substation escapement coil 111, and the two rotary drums 110, 310 rotate together. The substation drum 110 drives the selector 100 through its first half-notch movement. The drum contacts 120, 124, 324 have meanwhile been opened and the contacts 121, 122, 123, 320, 323 subsequently closed. This completes the first half-notch movements, and if the control station meter switch 410 has not meanwhile been operated to open its contact 414, the selecting movements will proceed, the energizing circuit for the control station selector relay 315 and the substation polarized relay 220 in this case including the contacts 323, 414 and 123 instead of the contacts 324 and 124. The two rotary drums 110, 310 continue their rotation, the substation drum driving the selector through its second half-notch movement and opening contacts 121, 122, 123 when this movement is completed, and subsequently reclosing contacts 120, 124. It should be noted that the contacts 121 open again before the time-lag of the substation meter relay 250, so that this relay although energized when the contacts 122 closed does not operate its contacts. The opening of contacts 123 breaks the selecting circuit over the pilot wires and allows the control station drum to proceed through its second half-notch movement, the contacts 320, 323 being opened and the contacts 321, 322, 325, 326 subsequently closed, the two drums then returning to their normal rest positions. It should be mentioned that the contacts 321 in the indicating circuit are preferably arranged to close immediately the control station selector 300 completes its second half-notch movement. The selecting movement into the new selected position (i. e. as illustrated that corresponding to the circuit-breaker 160 shown open) is now completed and the substation selector 100 has operated its contacts during the movement. Thus the contacts 130, 131 closed and the contacts 132, 133, 134 opened as soon as the normal zero position was left, and the contacts 140 closed before the first half-notch position was reached and opened again after it was left, whilst the contacts 150, 151, 152, 154 closed and the contacts 153 opened as soon as the full-notch position was reached.

In this second selected position the supervisory indicating circuit is complete and may be traced from the substation negative busbar 172 through the auxiliary change-over switch 166, the selector contacts 154, the indicating busbar 195, the contact 184, the pilot wire $P^4$, the contacts 374, 394, 404, 424, 321, the polarized indication relay 430, the contacts 421, 411, 402, 392, 372, the pilot wire $P^2$, and the contacts 182, 253 to the substation neutral busbar 173. The polarized indication relay 430 is therefore energized in a direction to close its contacts 432 and energize the negative coil 445, whereby the indicating mechanism is caused to give the desired circuit-breaker-open indication and the lock 396, 397 is applied to the trip push 390. The closing of the negative coil contact 447 is however ineffective owing to the fact that the selector contacts 330 are now open.

The control station operator may now, if he wishes, transmit an executive current to close the circuit-breaker 160. To effect this, he depresses his close push 400. This opens contacts 401, 402, 404, breaking the indicating circuit and closes contacts 403 and 405 in series respectively with the drum contacts 322 and 325. This causes an executive current of opposite polarity to the selecting current to be transmitted over the primary selecting circuit from the control station busbars 361, 362 through the pilot wires $P^3 P^4$ to the substation polarized relay 220, which operates in the executive direction to close its contacts 222 and energize the executive relay 230. The closing of the executive relay contacts 233 energizes the close relay 245 over the circuit above described since the contacts 163, 152 are closed, and the circuit-breaker closing coil 161 is energized through the close relay contact 246 to close the circuit-breaker 160. When this has been effected, the close push 400 having been released, the supervisory indicating circuit is now again complete, but owing to the fact that the auxiliary switch 166 has changed its position the polarity of the indicating current will now be such that the polarized indication relay 430 closes its contacts 431 to energize the positive coil 440 and thus give the desired indication that the executive function has been correctly performed. The apparatus is now again ready for the performance of further selecting movements similar to that above described, with or without the performance of executive functions in other selected positions.

It will be appreciated that if, instead of merely depressing the selector push 350 to initiate the selecting movement the operator chooses to depress and twist the push, thus closing the express selection contacts 352, a new selecting movement will be automatically initiated by the closing of the drum contacts 326 immediately the previous selecting movement is completed and the selectors will go on stepping round from position to position as long as the push is left depressed and twisted or until the end of the cycle when the opening of the selector contacts 334 will prevent further movement. As the selectors pass through each position, the supervisory indicating circuit is completed by the closing of the drum contacts 150

321 and the indicating mechanism is operated. Thus, assuming recording indicators are used, operation of the express selection contacts 352 will reset all the indicators and thus ensure that they give a correct record of the condition of the substation controlled apparatus.

As has been mentioned metering circuits can be established in the half-notch positions of the selectors, so that it is possible to obtain selective metering from a number of substation metering sources. The general procedure for the establishment of a selected metering circuit is to move the selectors first of all to the full-notch position immediately preceding the appropriate half-notch position and then by operation of the meter switch 410 to initiate the next selecting movement but to arrest such movement in the half-notch position. Thus assuming the system to be at rest in the full-notch selected position immediately before the desired half-notch metering position, operation of the meter switch 410 will amongst other things close contact 413 to energize the coil 353 and thus electromagnetically operate the selector push 350. A selecting movement will thus be initiated and will proceed as far as the half-notch position, when it will be arrested owing to the fact that the meter switch contact 414 is open. The closing of contact 415 on the meter switch will, when the appropriate selector contacts such as 341 close, energize the locking coil 381 of the selected meter 380 (assuming for example that the first of the metering circuits is to be established), and thereby release the meter pointer. The meter switch contact 412 prepares the actual metering circuit at the control station end.

At the substation the arresting of the selecting movement in the half-notch position allows the time-lag meter relay 250 to operate its contacts, since the drum contacts 121 remain closed. The opening of contact 253 breaks the indicating circuit at the substation end, this circuit already being broken at the control station at contacts 321 and 411, so that the second pilot wire P² is isolated for use for metering purposes. The closing of contacts 251, 252 completes the metering circuit from the selected metering source 200 at the substation, the selector contacts 140 meanwhile having closed. The metering circuit is now complete and runs from one side of the selected metering source 200, through the metering busbar 196, the contacts 251, 267, 275, 181, the pilot wire P¹, the contacts 371, 320 (now closed), 340 (now closed), the selected meter 380, the metering busbar 365, the contacts 412, 372, the pilot wire P², the contacts 182, 252 and the metering busbar 197 to the other side of the metering source 200. When the desired reading has been taken the meter switch 410 is released to open contact 415 and apply the lock to the meter pointer just prior to the opening of contact 412 which breaks the metering circuit itself. Contact 411 closes to prepare the indicating circuit and contact 413 opens to deenergize the coil 353 and release the selector push 350, whilst contact 414 closes to enable the selecting movement to proceed in the manner above described, the meter relay 250 being deenergized when the substation drum contacts 121 open. The system will thus come to rest in the next full-notch position with the indicating circuit complete.

The telephone arrangements will now be described, it being assumed that the system is at rest in the normal zero position. If now the control station operator wishes to call up the substation, he must insert the telephone plug 426 and take up his instrument with the pressel switch held gripped. This, as above mentioned, operates the dummy push 420. The opening of contact 424 and the closing of contacts 423, 425 cause a calling current to be transmitted to the substation over the pilot wires P³ P⁴, the circuit being identical with the executive circuit above described, with the exception that the drum contacts 325 are replaced by the selector contacts 333 closed only in the normal zero position. Thus the substation polarized relay 220 is energized in a direction to operate the executive relay 230. This relay acts at contact 232 to complete the circuit to the telephone calling bell 262 and at contact 234 to prepare the telephone speaking circuit. When the substation operator responds to the call, he lifts his receiver and thus breaks the calling circuit at the hook switch 261, and communication is established over the circuit from the substation telephone 260 through the contacts 267, 275, 181, the pilot wire P¹, the contacts 371, 335 and the plug 426 to the control station telephone 427, and thence through the plug 426, the contacts 422, 372, the pilot wire P² and the contacts 182, 234, 134 to the substation telephone. Release of the control station telephone pressel switch will cause the plug 426 to open and operate the dummy push 420, thus returning all the circuits to their normal condition.

If the substation operator wishes to call up the control station he will depress his telephone push 265. If the system is in the normal zero position, the effect of this will be to complete a circuit from the substation positive busbar 171 through the change-over contact 268 and the drum contacts 132 and thence over the supervisory indicating circuit back to the neutral busbar 173. This will cause the control station polarized relay 430 to operate its contacts 431 and energize the positive coil 440, which, besides operating the indicating mechanism to display the word "Telephone," acts at contact 442 to extinguish the green lamp 460 and at contact 443 to light the red lamp 462 and sound the telephone buzzer 461. The control station operator on responding to the call must insert the plug 426, as the result of which communication will be established as before, the substation operator releasing his push 265 to close contact 267 in the speaking circuit as soon as the calling bell 262 sounds.

If the system is not in the normal zero position when the operator depresses the telephone push 265, the contact 268 will be ineffective (since the selector contacts 132 are open), but in this case contact 266 completes a circuit from the neutral busbar 173 through the contacts 266, 130 (now closed), 181, the pilot wire P¹, the contacts 371, 391, 401, the control station general alarm relay 450, the contacts 424, 404, 394, 374, the pilot wire P⁴, the contact 184, the indicating busbar 195 and thence through the appropriate selector contacts such as 154 and the corresponding circuit-breaker auxiliary switch 166 to the positive or negative busbar 171 or 172. (If the system is at the moment in a half-notch position whilst metering is in progress, this circuit is completed through the drum contacts 122 instead of through the indicating busbar 195 and the circuit-breaker auxiliary switch). The control station general alarm relay 450 operates and makes its own retaining circuit at contact 452 and also at contact 451, lights the red lamp 464 and sounds the buzzer 463. When the control station operator responds to the call he must operate the selectors to bring them to the normal zero position, when the indicating mechanism will display the word "Telephone" in the manner above referred to and the contact 444 will open to deenergize the relay 450 and stop the buzzer 463 (the selector contacts 331 now being open), by which the operator will be advised that the buzzer had been operated in response to a telephone call. He will consequently insert his plug 426 and establish communication as above described.

The transmission of general alarm signals from the substation to the control station will now be described. Such signals are in all cases controlled by the substation general alarm relay 270, which is energized whenever a change occurs automatically in the condition of any of the controlled circuit-breakers or other apparatus by the momentary closing of a flick switch such as 165. The relay 270 at once makes its own retaining circuit at contact 274 through the definite time limit relay contact 281 and either the drum contacts 120 or the selector contacts 131 and the time limit relay 280 is energized at contact 273. The manner in which the general alarm signal is transmitted to the control station and its effect in that station vary in accordance with the condition of the remote control system at the time when the signal is initiated.

The case when the system is at rest in the normal zero position of the selectors will be described first. In this case the general alarm relay contact 271 completes a circuit from the substation negative busbar 172 through the contacts 271, 268, 132 and thence through the supervisory indicating circuit back to the neutral busbar 173, as a result of which the control station polarized relay 430 operates the negative coil 445. This, besides causing the indicating mechanism to display the words "General alarm," acts at contact 448 to extinguish the green lamp 460 and at contact 447 to energize the reindication relay 470, which at once makes its own retaining circuit at contact 471 through the stop alarm push contact 467. The relay 470 also acts at contact 473 to light the red lamp 464 and sound the buzzer 463 and at contact 472 to energize the coil 353 and thereby to depress and twist the selector push 350. This initiates an express selecting cycle which proceeds until the normal zero position is again reached, being stopped by the opening of the selector contacts 334. The indicating mechanism is thus caused to give a record of the condition of the substation apparatus, from which the change which caused the general alarm will be readily apparent. When the reindication cycle is completed, the system returns to rest in the normal zero position with the exception that the reindication relay 470 remains energized and the buzzer 463 continues to sound. When the control station operator arrives to attend to the signal, he depresses the stop alarm push 465 to break the retaining circuit to the relay 470 and thus stop the buzzer, and will then take such steps as are required to deal with the situation. The selector contacts 332 are provided to ensure that the express selection cycle will continue right round to the normal zero position, even if the operator depresses the stop alarm push 465 before the cycle is complete. It should be mentioned that as soon as the substation controlling drum begins to move as a result of the initiation of the express selecting cycle, the retaining circuit to the substation general alarm relay 270 is broken at contact 120, and this relay returns at once to its normal condition in readiness for any subsequent general alarm signals.

In the case when the general alarm is initiated when the system is at rest in any position other than the normal zero position, the general alarm relay contact 271 will be ineffective since the selector contacts 132 will be open, but the contact 272 completes a circuit from the neutral busbar 173 over the first and fourth pilot wires to the control station general alarm relay 450, this circuit being the same as that completed by operation of the telephone push contact 266, with which the contact 272 is connected in parallel. The control station general alarm relay will operate the buzzer 463, and the control station operator will as above described operate the selectors to bring them into the normal zero position, but the relay 450 will still remain energized and keep the buzzer sounding until the stop alarm push 465 is operated, since the contact 444 remains closed. The operator will then have to operate the selectors again to determine the cause of the general alarm and to deal with the situation.

It will be noticed that with the foregoing arrangement a telephone calling signal and a general alarm signal when transmitted in any position other than the normal zero position have generally similar effects in the control station, and the control station operator cannot distinguish between the two until he has brought the selectors to the normal zero position, when in the one case the indicating mechanism will display the word "Telephone" and the buzzer 463 will stop sounding, whilst in the other case the indicating mechanism will remain inoperative but the buzzer 463 will continue to sound until the stop alarm push 465 is operated. The system can however, if desired, readily be modified to distinguish between the two signals by polarizing the general alarm relay 450 and causing it to operate different buzzers (e. g. the two buzzers 461, 463) for the two signals. For this purpose it is necessary that the two signalling currents should be of opposite polarity and the contacts 272 and 266 can be connected respectively to the positive and negative busbars 171, 172, the pilot wire $P^4$ being connected to the neutral busbar 173 instead of to the indicating busbar 195. This busbar 195 and the selector contacts 132 would then be connected to the pilot wire $P^2$ through the meter relay contact 253 and the drum contacts 122 would be omitted, the positive and negative coils 440, 445 being interchanged at the control station.

The description of the arrangement and operation of the automatic periodic meter-correcting apparatus will be deferred until after the description of the alternative remote control system shown in Figure 7.

The system of Figure 7 employs two pilot wires $P^5$ $P^6$ connecting the control station and the substation, which are shown respectively in the lower and upper halves of the figure. This system is generally similar to the four pilot wire system of Figure 6 as far as the processes of selection, supervisory indication, metering, and general alarm in the normal zero position, are concerned apart from the small modifications necessitated by the reduction in the number of pilot wires. The system, however, does not provide for the transmission of executive currents, unless additional pilot wires are used. For selection the two pilot wires correspond to the pilot wires $P^3$ $P^4$ of Figure 6, whilst for supervisory indication they correspond to the pilot wires P² P⁴, the controlling drum arrangements being slightly modified to enable the indicating and selecting currents to flow over the same pilot wires. For metering and for the general alarm in the normal zero position the pilot wire P⁶ is utilized in conjunction with an earth return circuit. Superimposed high frequency currents are employed for the general alarm in positions other than the normal zero position and also for the establishment of telephone communication.

The details of the system will now be described.

The substation selector 500 has groups of contacts which are operated in its various positions associated with the substation controlled apparatus, of which one circuit-breaker 510 with auxiliary switches 511—513 and two metering sources 515, 516 are shown by way of example. Thus the contacts 501—503 are associated with the normal zero position, the contacts 504 with the first half-notch position corresponding to the metering source 515, the contacts 505—507 with the second selected position corresponding to the circuit-breaker 510, and the contacts 508 with the next half-notch position corresponding to the metering source 516.

As in the previous arrangement the selector 500 is driven by a rotary drum 520 having contacts 521—525 controlled by an escapement coil 526 which is energized under the control of the contact 531 of a selector relay 530. This selector relay is not in this instance controlled by a polarized relay (since no provision is made in this system for the performance of executive functions), but may itself be polarized in certain cases to prevent operation by currents of opposite polarity. The selector relay 530 is directly connected to the pilot wires P⁵ P⁶ through various contacts including the normally closed contact 536 of an auxiliary indication relay 535 having also a normally open contact 537. This relay 535 is connected on one side to an indicating busbar 538, so that it is in series with the supervisory indicating circuit and is always energized when indicating currents are flowing. This indicating busbar 538, together with a second indicating busbar 539, is energized under the control of selector contacts such as 505, 506 in series with change-over auxiliary switches 511, 512 on the circuit-breaker 510, the arrangement being such that one indicating busbar is connected to a positive busbar 541 and the other to a negative busbar 542 in accordance with the condition of the circuit-breaker 510. The positive and negative busbars 541, 542 are connected to the poles of a local battery 540 through the contacts 546, 547 of a lock-out switch 543 having contacts 544, 545 controlling the two pilot wire circuits. The modifications necessary in the arrangement of the escapement pins and the contacts of the rotary drum in order to allow the supervisory indicating currents to flow over the same pilot wires as the selecting currents will be described later.

The metering sources 515, 516 . . . in series respectively with the selector contacts 504, 508 . . . are connected between two metering busbars 550, 551, of which the first is earthed, whilst the second is connected to the pilot wire P⁶ through various contacts including the contact 556 of a time-lag meter relay 555 energized through the drum contacts 525.

The circuit-breaker auxiliary flick switch 513 in series with the selector contacts 507 connects the positive busbar 541 to a general alarm busbar 560, which is connected to one side of a general alarm relay 561 connected on the other side to the negative busbar 542. This relay 561, when energized momentarily by a flick switch, makes its own retaining circuit at contact 562 through either the selector contacts 501 (closed in all positions except the normal zero position) or the drum contacts 524. The contact 563 of this relay is connected either through the selector contacts 502 (closed only in the normal zero position) to the indicating busbar 539 or through the selector contacts 503 (closed in all positions except the normal zero position) to a tuned vibrator 565, which generates H. F. currents and is coupled through condensers 566, 567 to the two pilot wires P⁵ P⁶. Tuned choke coils 568, 569 are inserted in the pilot wire circuits beyond the coupling points to prevent any inadvertent operation of the remote control apparatus by the H. F. currents.

Telephony is given precedence over all other functions in this system and communication is established by means of H. F. currents (of a frequency different from that of the vibrator 565) superimposed on the pilot wires. The substation telephone apparatus diagrammatically indicated at 570 and including in addition to the telephone instrument a tuned buzzer and a tuned vibrator, is controlled by a four-way plug 571. The contacts 572 of this plug connect the vibrator through coupling condensers 574, 575 to the two pilot wires P⁵ P⁶ (the coupling points being between the lock-out contacts 544, 545 and the pilot wires so that telephone communication can be established even when the remote control apparatus is temporarily out of commission). The contacts 573 of the plug serve to energize a relay 580 having contacts 581, 582 in series with the two pilot wire circuits, so that insertion of the plug 571 disconnects the pilot wires from the normal remote control apparatus. Tuned choke coils 576, 577 are provided to prevent inadvertent operation of the remote control apparatus by the H. F. calling currents.

The control station selector 600 has a group of contacts 601—605 associated with the normal zero position and further groups of contacts, such as 606—607, 608—609, operated in the various half-notch positions. The contacts 606, 608 . . . control the connections of the various meters 610, 612 . . . to metering busbars 615, 616 (of which the latter is earthed), whilst the contacts 607, 609 . . . control the connections of the locking coils 611, 613 . . . of the meters to meter locking busbars 617, 618 energized from a local battery 619.

The selector 600 is driven by a rotary drum 620 having contacts 621—628, whose escapement coil 629 is controlled both by the contact 631 of a selector relay 630 and by the contact 636 of a selector push 635. The selector push has an express selection contact 637 in series with the drum contacts 627 and the selector contacts 605, and is also capable of electromagnetic action by a coil 638.

A local battery 640 is provided in the control station and is connected to positive and negative busbars 641, 642 through the contacts 646, 647 of a lock-out switch 643 having further contacts 644, 645 controlling the two pilot wire circuits.

The supervisory indicating currents from the substation are received by a polarized relay 650 having contacts 651, 652 respectively controlling a positive coil 653 and a negative coil 654, which operate the indicating mechanism, the negative coil 654 also operating a contact 655. The polarized relay 650 is connected on one side to the pilot wire P⁶ through various contacts including the drum contacts 624, and on the other side either to earth through the selector contacts 602 (closed only in the normal zero position) or to the pilot wire P⁵ through various contacts including the selector contacts 601 (closed in all positions except the normal zero position) and the drum contacts 622. The negative coil contact 655 in series with the selector contacts 603 (closed only in the normal zero position) controls the energization of a reindication relay 660 having contacts 661—663, of which the contact 662 is a retaining contact in series with either the selector contacts 604 or a contact 666 on a stop alarm push 665, and the contact 663 controls the circuit to a red lamp 667 and a buzzer 668, whilst the contact 661 is in the energizing circuit of the coil 638 acting electromagnetically on the selector push 635.

The establishment of a metering circuit is controlled by a meter switch 670 having contacts 671—674, of which the contact 671 is connected in series with the drum contacts 623 in the selector relay circuit, the contact 672 controls the energization of the selector push coil 638, the contact 673 controls the connection of the metering busbar 615 through the drum contacts 628 to the pilot wire P⁶, and the contact 674 acts to connect the two meter locking busbars 617, 618 together through the battery 619. The meter switch is capable of electromagnetic operation by a coil 675 under the control of the contact 676 of a relay 677 energized through the motor driven contact 678 of automatic periodic meter-correcting apparatus, a hand-switch 679 being provided to cut this apparatus out of action when required.

The telephone equipment is similar to that at the substation, the apparatus indicated at 680 being controlled by a four-way plug 681 whose contacts 682 connect a tuned vibrator to the pilot wires through coupling condensers 684, 685, whilst the contacts 683 operate a relay 690 with contacts 691, 692 in the pilot wire circuits and a contact 693 for cutting the periodic meter-correcting apparatus out of action when the relay operates. Tuned chokes 686, 687 are provided in the pilot wire circuits.

The H. F. general alarm currents are received by a tuned general alarm relay diagrammatically indicated at 695 coupled to the pilot wires through condensers 696, 697, tuned chokes 698, 699 being provided. This relay 695 is arranged to operate a buzzer and (if energized during a selecting cycle) to retain itself energized until the normal zero position is reached, when it can, if desired, be made to initiate an automatic reindication cycle.

The modifications in the rotary drum arrangements to allow the use of the same pilot wires for selection and indication will now be described. The arrangement of the escapement pins is identical with that for the four pilot wire system as far as the end of the first half notch movements, i. e. as far as the pins C⁷ c⁷ of Figures 2 and 3. In the previous system both escapement coils are energized in the half-notch position (provided the meter switch has not been operated) and the pins allow the control station drum to move to a position just before it begins to drive the selector through its second half-notch movement (the pin C⁸ of Figure 2) and the substation drum to move right round through the second half-notch movement nearly to the zero position (the pin c⁸ of Figure 3). In the system of Figure 7 the pin c⁸ is replaced by a pin indicated in dotted line at c¹³ in Figure 3, with the result that both drums are arrested together just prior to the beginning of the second half-notch movement and the substation drum contacts 522 open at this point to break the selecting circuit and deenergize the selector relays 530, 630 and consequently also the escapement coils 526, 629. The two drums then rotate in unison through their second half-notch movements to the zero position. Immediately after the second half-notch movements of the selectors have been completed, the drum contacts 523, 622, 624 close to complete the supervisory indicating circuit which is taken (assuming the selected circuit breaker 510 to be open) from the substation positive busbar 541 through the auxiliary switch 511, the selector contacts 505 (now closed), the indicating busbar 539, the tuned choke 569, the contacts 545, 582, the tuned choke 577, the pilot wire P⁶, the tuned choke 687, the contacts 692, 645, the tuned choke 699, the drum contacts 624, the polarized indication relay 650, the selector contacts 601 (now closed), the drum contacts 622, the tuned choke 698, the contacts 644, 691, the tuned choke 686, the pilot wire P⁵, the tuned choke 576, the contacts 581, 544, the tuned choke 568, the drum contacts 523, the auxiliary indication relay 535, the indicating busbar 538, the selector contacts 506 and the auxiliary switch 512 to the negative busbar 542. The polarized indication relay 650 and the auxiliary indication relay 535 are both energized, the former operating the negative coil 654 and causing the indicating mechanism to give the desired indication (the contact 655 being ineffective since the selector contacts 603 are open). At the same time the auxiliary indication relay 535 closes its contact 537 bridging the drum contacts 523, the relay operating quickly enough to maintain the indicating circuit complete when the contacts 523 open. The contact 536 on this relay opens the connection between the selector relay 530 and the second pilot wire circuit. The control station drum contacts 622, 624 remain closed until just after a new selecting movement is initiated, and when this takes place the auxiliary indication relay 535 is deenergized to close its contact 536 and thus to prepare the circuit for the new selecting movement. The time-lag on the auxiliary indication relay 535 is operative only when the relay is deenergized and is provided for the purpose of enabling the indicating circuit to be maintained in the event of a change of condition of the selected circuit-breaker whilst the indicating currents are flowing, but this time-lag is short enough to allow the contact 536 to close in time when the next selecting movement is started.

For metering the arrangement is substantially identical with that for the system of Figure 6, with the exception of the substitution of the second pilot wire P⁶ and an earth return circuit for the two pilot wires previously used. Thus the metering circuit is taken from one side of the selected metering source, say 515, through the corresponding selector contacts 504, the metering busbar 551, the meter relay contact 556, the tuned choke 569, the contacts 545, 582, the tuned choke 577, the pilot wire P⁶, the tuned choke 687, the contact 692, 645, the tuned choke 699, the meter switch contact 673, the drum contacts 628, the metering busbar 615, the selected meter 610, the corresponding selector contacts 606 and the metering busbar 616, and thence via earth and the substation metering busbar 550 to the other side of the metering source.

The transmission of a general alarm signal is controlled by the general alarm relay 561, which is momentarily energized as in the previous arrangement and makes its own retaining circuit at contact 562 through the selector contacts 501 or the drum contacts 525. If the selectors are in their normal zero position the general alarm signal is transmitted to the control station over part of the supervisory indicating circuit with an earth return. This circuit is taken from the substation positive busbar 541 through the general alarm relay contact 563, the selector contacts 502 and the indicating busbar 539 and thence following the indicating circuit through the pilot wire $P^6$ as far as the polarized indication relay 650 and to earth through the selector contacts 602 (the contacts 601 being open), the substation negative busbar 542 being earthed to provide a return circuit. Thus the polarized indication relay 650 is energized in a direction to energize the negative coil 654, which operates the indicating mechanism to display the words "General alarm" and closes its contact 655. The reindication relay 660 is thus energized and causes a reindicating cycle to be performed in the same manner as in the system of Figure 6.

For the general alarm in all positions other than the normal zero position the closing of the general alarm relay contact 563 operates the tuned vibrator 565 since the selector contacts 503 are closed, the H. F. currents generated being superimposed on the two pilot wires and received by the tuned general alarm relay 695.

The operation of establishing telephone communication is initiated in exactly the same way from both stations. Thus, assuming the substation operator wishes to call up the control station, he will insert his plug 571. This connects the tuned telephone vibrator across the pilot wires and also operates the relay 580 to break the normal pilot wire circuits at contacts 581, 582. The H. F. calling currents are received by a tuned buzzer forming part of the control station apparatus indicated at 680. On receipt of the calling signal the control station operator inserts his plug 681 to send a return calling signal and to isolate the pilot wires at contacts 691, 692, and the lifting of the telephone receivers completes the speaking circuit and breaks the calling circuit in the usual manner.

It will be understood that in place of using H. F. currents for the telephone calling the general alarm signals, it is also possible so to arrange the system as to employ unidirectional D. C. currents (from separate batteries) with rectifiers for preventing passage of currents in the opposite direction from the existing batteries.

Figure 9:
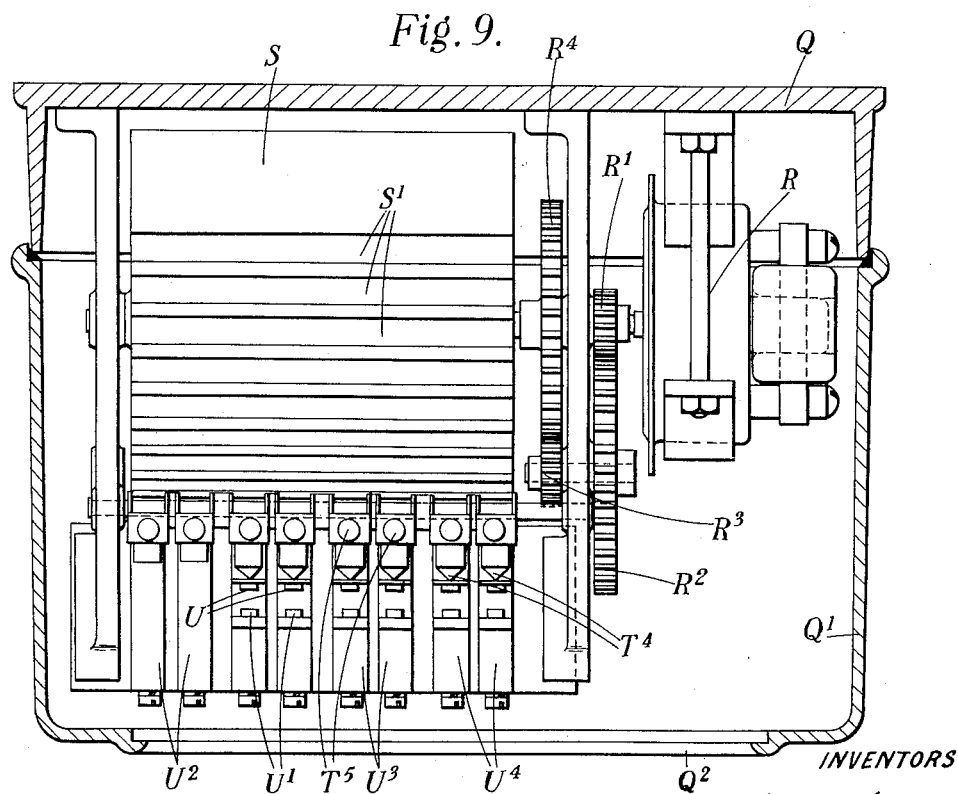

Figures 8–10 illustrate in detail the apparatus employed for controlling the automatic periodic meter correction which is diagrammatically indicated at 417, 418 in Figure 6 and at 678 in Figure 7. This apparatus is mounted in a casing Q having a detachable cover $Q^1$ with a front window $Q^2$ and comprises a constant speed electric motor R which drives a contact-operating drum S through suitable reduction gearing $R^1$ $R^2$ $R^3$ $R^4$ at a constant slow speed of rotation, say one revolution every fifteen minutes. At each of a number of axial positions dependent on the number of contacts it is required to operate (or as shown extending continuously along its surface if all the contacts are to be simultaneously operated) the drum S is provided with grooves or serrations $S^1$ constituting a circumferential cam surface, with which engage a number of pairs of rollers T $T^1$. One of the rollers T is arranged to be slightly in advance of the other roller $T^1$ circumferentially with respect to the drum S, so that it will enter and leave each groove $S^1$ shortly before the roller $T^1$, its moment of leaving the groove however being after the companion roller $T^1$ has entered the same groove. The two rollers T $T^1$ are carried on lever arms $T^2$ rotatably mounted on a spindle $T^3$, each lever being provided with a projection $T^4$ acting on a pair of spring contacts U $U^1$. The two pairs of contacts U $U^1$ acted on by the two levers $T^2$ respectively carrying the rollers T and $T^1$ are connected in parallel, or alternatively can be replaced by a single pair of contacts engaged by both lever projections $T^4$. Adjusting screws $T^5$ are provided to control the circumferential spacing of the two rollers T $T^1$, and it will be appreciated that in this manner the period of making or breaking of the circuit controlled by the contacts can be accurately adjusted to the desired value. This arrangement is in the nature of a fine adjustment and for coarser adjustments it will be necessary to substitute an alternative drum with different grooving.

The number of sets of contacts controlled by the drum may vary according to requirements. In one arrangement, namely that diagrammatically indicated in Figures 6 and 7, the drum operates only one set of contacts, these contacts controlling the energizing circuit of the coil 416 or 675 (directly or through a relay such as 677) acting electromagnetically on the meter switch. Alternatively the drum may operate a series of contact sets corresponding to (and respectively connected in parallel with) the contacts on the meter switch. Such an arrangement is shown in Figures 8–10 in which four sets of contacts $U^2$ $U^1$ $U^3$ $U^4$ are employed respectively corresponding to the four meter switch contacts 671, 672, 673, 674 in the system of Figure 7. Thus the effect of one groove $S^1$ acting on the sets of contacts will be equivalent to a single operation of the meter switch.

The grooves $S^1$ are equally spaced circumferentially around part of the drum S, their number corresponding to the number of selector positions, and the remainder of the drum has a plain cylindrical surface $S^2$. A generally convenient timing adjustment for each contact operation, will consist of, say, twenty seconds with the contacts held operated and, say, three seconds interval between successive operations, these times corresponding respectively to the time necessary for obtaining a steady meter reading with a repeater system of remote metering and for the movement from one selector half-notch position to the next. Thus every fifteen minutes a cycle will be initiated and all the meter records will in turn be corrected.

The arrangement above described is given by way of example and the desired periodic meter correction can be obtained in a variety of other ways. One convenient alternative arrangement is illustrated in Figure 11 and comprises a time switch V which closes its contacts $V^1$ for a brief period, say five seconds, at predetermined intervals of fifteen minutes, this time switch causing the cyclic operation of a group of relays controlling the successive establishment of the metering circuits. Thus the contacts $V^1$ may be connected in parallel with selector contacts $V^2$ (closed in all positions except the normal zero position) in the energizing circuit of a relay W having a time delay of, say, three seconds in its lift. The contact $W^1$ of this relay when closed after the three-second time delay energizes a second relay X, which at once makes it own retaining circuit at contact X³, completes the energizing circuit at contact X² to a third relay Y and energizes at contact X¹ a coil Z acting electromagnetically on the meter switch. The relay Y as soon as it is energized breaks the energizing circuit of the relay W at contact Y¹, and then after a time delay of, say, twenty seconds operates contact Y² to short-circuit the operating coil of the relay X. The consequent deenergization of the relay X deenergizes both the relay Y and the meter switch coil Z. The deenergization of the relay Y reestablishes the energizing circuit of the relay W through the selector contacts V², and the relays again operate in sequence, the cycle continuing until the selector reaches its normal zero position, when the apparatus comes to rest until restarted after the fifteen minutes period of the time switch V.

It will be appreciated that the remote control system of Figure 7 is such as to enable the two pilot wires P⁵ P⁶ to be temporarily borrowed for protective purposes in the manner described in the copending United States patent application Serial No. 438,890 in the names of two of the present applicants. In a similar manner the system of Figure 6 may be readily modified to permit of such borrowing for protective purposes.

The various control pushes and switches at the control station in both systems are preferably mechanically interlocked with one another to prevent mal-operation, the interlocking mechanism being arranged for example in a manner generally similar to that described in United States patent application Serial No. 318,972 standing in the names of one of the present applicants and another.

The arrangements more particularly described have been given by way of example only and may be modified in various ways within the scope of the invention.

What we claim as our invention and desire to secure by Letters Patent is:—

1. An electric remote control system including in combination a control station, a controlled station, pilot wires connecting the control station and the controlled station, a rotary drum at the controlled station to which sequential angular movements are to be imparted, contacts operated by the rotation of the drum, means for applying a force normally tending to rotate the drum, a pin disc connected to the drum, suitably spaced pins arranged in two circular rows at different radii on the pin disc, a plunger bar radially movable with respect to the pin disc and having a slot which can occupy one or other of two radial positions corresponding to the two rows of pins, an escapement coil acting electromagnetically on the plunger bar to effect movement thereof from one radial position to the other, and means whereby the alternate energization and deenergization of the escapement coil is controlled partly from the control station over the pilot wires and partly automatically by the drum contacts.

2. In an electric selective remote control system, the combination of two contact-making selectors which are disposed respectively at the control station and at the controlled station and to which corresponding step-by-step movements are to be imparted a rotary controlling drum for each selector which performs a series of sequential angular movements for each stepped movement of the selector, a pin disc connected to each drum, suitably spaced pins arranged in two circular rows at different radii on each pin disc, a plunger bar radially movable with respect to each pin disc and having a slot which can occupy one or other of two radial positions corresponding to the two rows of pins, an escapement coil acting electromagnetically on each plunger bar to effect movement thereof from one radial position to the other, and means for effecting simultaneous energization and deenergization of the two escapement coils whereby the correct relationship between the movements of the two drums is ensured.

3. In an electric selective remote control system, the combination of two contact-making selectors which are disposed respectively at the control station and at the controlled station and to which corresponding step-by-step movements are to be imparted, a rotary controlling drum for each selector which performs a series of sequential angular movements for each stepped movement of the selector, means whereby each drum causes its selector to perform two separate half-notch movements together constituting one stepped movement, means for ensuring the correct relationship between the movements of the two controlling drums, and means for preventing either selector from performing its second half-notch movement until both selectors have completed their first half-notch movements.

4. In an electric selective remote control system, the combination of two contact-making selectors which are disposed respectively at the control station and at the controlled station and to which corresponding step-by-step movements are to be imparted, a rotary controlling drum for each selector which performs a series of sequential angular movements for each stepped movement of the selector, intermittently acting gearing between each drum and its selector whereby the selector is caused to perform two separate half-notch movements together constituting one stepped movement, contacts operated by the rotation of the two drums, pilot wires connecting the control station and the controlled station, means for applying to each drum a force normally tending to rotate the drum, an electromagnetically operated escapement mechanism for determining the extent of the movements of each drum, and means for electrically controlling the two escapement mechanisms over a circuit including the pilot wires and the drum contacts, the drum contacts and the escapement mechanisms being so arranged as to prevent either selector from performing its second half-notch movement until both selectors have completed their first half-notch movements.

5. In an electric selective remote control system, the combination of two contact-making selectors which are disposed respectively at the control station and at the controlled station and to which corresponding step-by-step movements are to be imparted, a rotary controlling drum for each selector which performs a series of sequential angular movements for each stepped movement of the selector, means whereby each drum causes its selector to perform two separate half-notch movements together constituting one stepped movement, means for ensuring the correct relationship between the movements of the two drums, and means for so controlling the sequential movements of the drums as to ensure that the first half-notch movement of the controlled station selector does not commence until the control station selector has performed its first half-notch movement and that the second half-notch movement of the control station selector does not commence until the controlled station selector has completed its second half-notch movement.

6. The combination with the features set forth in claim 5, of a device at the control station normally permitting the second half-notch movement of the control station selector to commence automatically on completion of the first half-notch movement of the controlled station selector, means whereby operation of such device prevents further movement of the controlling drums after completion of the first half-notch movements, contacts which are closed by the controlling drum at the controlled station when the controlled station selector has completed its first half-notch movement and are opened again during the second half-notch movement thereof, and a time-lag relay in the controlled station which is energized on closure of such contacts, the time-lag being such that the relay will be deenergized again before the operation of its contacts if the second half-notch movements are allowed to proceed automatically on completion of the first half-notch movements but will operate its contacts if the device at the control station has been operated.

BRUCE HAMER LEESON.
WILLIAM ANDERSON.
DOUGLAS EDWARD LAMBERT.